United States Patent Office 3,552,810
Patented Jan. 5, 1971

---

3,552,810
HYDROSTATIC BEARING
Heinrich Korrenn, 28 Segnitzstrasse,
872 Schweinfurt, Germany
Filed Nov. 6, 1968, Ser. No. 773,907
Claims priority, application Germany, Nov. 6, 1967,
1,625,568
Int. Cl. F16c *17/06*
U.S. Cl. 308—160
10 Claims

ABSTRACT OF THE DISCLOSURE

A hydrostatic bearing in which several cushions of fluid medium under hydrostatic pressure transmit the load between a fixed part and a rotating supported part and in which the fluid cushions are grouped together in several groups each of them being associated with a separate pump for supplying the fluid medium so that on failure of one or more pumps or cushions the bearing remains in action.

BACKGROUND OF THE INVENTION

The invention relates to a hydrostatic bearing, especially for heavy cartwheel antennae, in which several cushions of a fluid medium under hydrostatic pressure transmit the load between the rotating supported structure and the fixed structure that carries it.

As well as the use of roller bearings and hydrodynamic journal bearings it is also already known to use hydrostatic bearings in supporting rotating structures. In contrast to roller bearings and hydrodynamic journal bearings the load of the part to be supported is carried in hydrostatic bearings by cushions of a fluid medium disposed in the bearing surfaces and subjected to hydrostatic pressure. Particularly interesting in hydrostatic bearings is their extremely small friction even at the lowest velocities and on starting from rest (friction coefficients of around $0.01 \times 10^{-3}$ at rubbing velocities of 0.1 m./sec.). Under the same conditions the friction coefficients for roller bearings are about 100 times higher. Hydrostatic bearings, moreover, exhibit a high load capacity and a high degree of stiffness and furthermore, they are distinguished by low wear. So called "stick-slip" effects do not arise.

These characteristics make the use of hydrostatic bearings of advantage in supporting large and heavy cartwheel antennae. Amongst other things, such antennae operate at very low speeds of rotation, roughly between 6 r.p.m. and 0.00003 r.p.m. and below.

Such bearings are known. For example a bearing for a radar screen is known (U.S. Pat. No. 3,052,505) in which the rotating bearing component comprises a ring which is built up of individual segments necessitated by its substantial diameter. In order to compensate for the resulting inaccuracies two rows of pads are provided, cooperating with the ring axially and radially. The pads are each provided on that side which is opposite the rotating ring with a trough connected to a fluid pressure pipe so that hydrostatic support is given to the rotating bearing ring made up of segments. Each pad is supported on a part-spherical body mounted eccentrically on a fixed frame. Through this eccentrically supported part-spherical body the spacing away from the fixed frame of that side of each pad which is provided with the said trough can be adjusted in accordance with the misalignment of that segment of the rotating bearing ring which cooperates with the pad in question, through a suitable preset stepwise adjusting mechanism.

SUMMARY OF THE INVENTION

The aim of the invention is to improve hydrostatic bearings of the kind indicated above, especially those suitable for use on heavy cartwheel antennae, so that they continue to operate even in the event of damage and allow the supported component to be brought to rest under control without difficulty and without damage to the bearing.

This is achieved according to the invention in that the fluid cushions which are present are connected together in groups of at least three cushions which are uniformly spaced apart in the circumferential direction of the supported component and that each group has associated with it a separate pump for supplying the fluid medium. By this distribution of the fluid cushions around the periphery of the bearing, connected to one and the same of a number of fluid feed pumps, it is ensured that on failure of one or more pumps or cushions the bearing remains in action as long as even only one group of cushions and its associated feed pump remain in operation.

According to a preferred feature of the invention the driving motor of each pump can be provided on its shaft with a flywheel of such a size that on failure of the motor, for example on failure of the current supply, the delivery of the fluid to the cushions is maintained until the supported rotating component comes to rest. The flywheels continue to drive the associated pumps despite the failure of the associated driving motor until the supported part comes to a standstill. This is therefore still supported by the fluid cushions during the whole period of time that it is rotating. Metallic contact is only possible when the supported part is at a standstill. In this way damage to the bearing, even if all the motors fail, is avoided.

Advantageously each of the cushions of fluid medium can be formed by means of a pad of which the one face that has the trough connected to a fluid supply passage cooperates with a supporting surface on the part to be supported, while its other (rear) face engages through a ball against an adjusting member which is displaceable on the fixed structure to alter the spacing between the supporting surface and the rim of the trough, which is formed to correspond to the shape of the surface.

It is accordingly an object of the invention to provide a hydrostatic bearing particularly adapted for use with heavy antennae which protects against bearing damage in the event of pump failure.

It is another object of the invention to protect against bearing damage by grouping a series of fluid cushions into groups of at least three equally spaced cushions.

It is a further object of the invention to protect against bearing damage by providing each group of cushions with a separate fluid pump.

It is still another object of the invention to protect against bearing damage by providing means for continued pumping of fluid, even in the event of pump failure, for a time at least equal to that time necessary to bring the supported component to rest.

These and other objects of the invention, as well as many of the attendant advantages thereof, will become more readily apparent when reference is made to the following description taken in conjunction with the accompanying drawings.

DESCRIPTION OF THE PREFERRED EMBODIMENT

Figure 1:
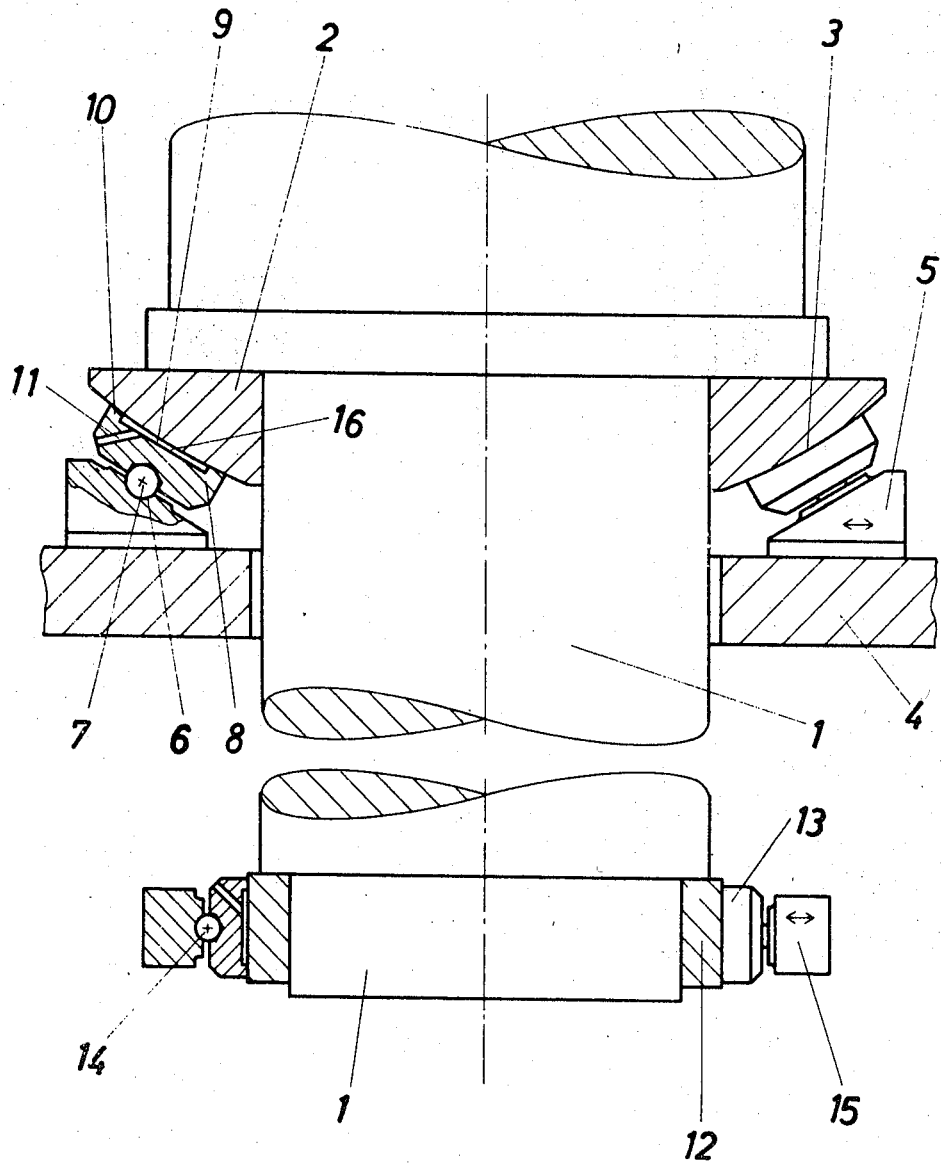
FIG. 1 is a longitudinal sectional elevation through a bearing according to the invention for a large cartwheel antenna.

Referring to FIG. 1, the spindle 1 of a cartwheel antenna, which is otherwise not shown, is provided with with an undivided bearing ring 2 which has a spherical supporting surface 3. The center of curvature of this surface lies on the axis of the spindle 1.

A number of adjusting members 5 are arranged in a radially displaceable manner, uniformly distributed around the periphery of the spindle 1, on the fixed structure or support ring 4. Each adjusting member 5 is provided with a recess 6 in which lies a ball 7. On the ball 7 is supported a cylindrical pad 8 and in fact the ball 7 enters partially into a blind recess in the rear face of the pad 8.

Each pad 8 is provided with a trough 9 of which the rim 10 matches the shape of the supporting surface 3. A fluid feed passage 11 extends away from the trough 9.

The troughs 9 are supplied with the fluid medium through the passages 11 so that a cushion of fluid is formed between the supporting surface 3 and each pad 8 and accordingly the bearing ring 2 floats, complete with the structure secured to it. This bearing takes the weight of the antenna and also takes additional radial forces, for example arising through wind pressure. Because of the spherical shape of the supporting surface 3 for the bearing ring 2, it is possible for the spindle to adjust itself freely, as guided by the radial bearing provided additionally at the lower end of the spindle 1, which is made up of a bearing ring 12 on the spindle 1 and co-operating pads 13 which are supported through balls 14 on adjusting members 15 which are mounted to be radially displaceable. However, at the lower end of the spindle 1 there could be provided a roller bearing instead of this hydrostatic bearing as only relatively light loads are supported at this point.

The uniform loading of the individual pads 8 and 13 is ensured by setting devices (not shown) by which the adjusting members 5 and 15 are displaced radially towards the spindle 1 or towards the bearing rings 2 and 12. Manometers (not shown) are connected to the individual pads 8 and 13 and from them can be read indications of the loadings of the individual pads, which are supplied with a constant quantity of oil.

Figure 2:
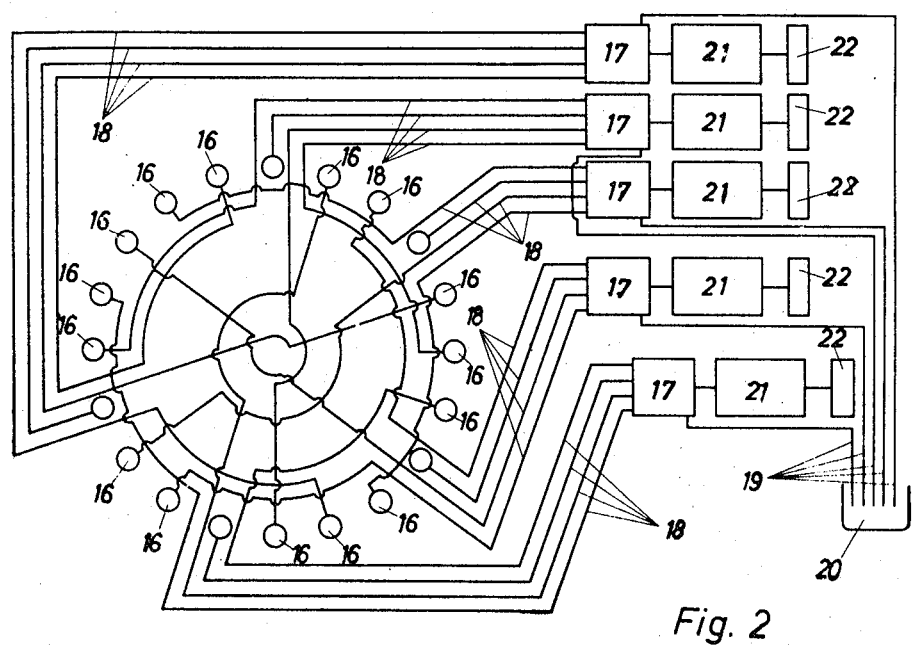
FIG. 2 shows a diagrammatical arrangement of the fluid cushions of the bearing of FIG. 1.

From FIG. 2 can be seen the arrangement according to the invention of the cushion of fluid 16 formed with the aid of the pad 8 and the bearing ring 2. Twenty cushions 16 are provided. These are divided into five groups of four cushions 16 each. The four cushions 16 of one group are spaced apart by 90° from each other around the common pitch circle. In this way there are obtained four quadrants in each of which are five cushions 16 all belonging to different groups.

The association with a particular group results from a connection to the same fluid feed pump 17, i.e., all the four cushions 16 of a group are connected to one and the same pump 17 and fed with fluid, generally oil. This is done through pipes 18 connected to the passages 11 in the pads 8 (FIG. 1).

By this arrangement of the fluid cushions 16 there is obtained the result that the bearing ring 2 and the structure connected to it remains floatingly supported as long as at least one of the pumps 17 is still in action. In this case the ring 2 is always still supported by four cushions distributed uniformly around its periphery and so direct engagement of the ring 2 against the pads 8, i.e., metallic contact between these parts, which would result in destruction of the bearing if the spindle 1 is rotating, is avoided.

Moreover the arrangement of the fluid cushions according to the invention substantially simplifies the replacement of individual components of the bearing and indeed it even allows replacement during operation, i.e., without the supported part having first to be brought to a halt.

Each pump 17, connected through an intake pipe 19 to a reservoir 20 for the fluid (oil), is driven by an electric motor 21. The motors 21 are each provided with a flywheel 22 mounted on the driving shaft of the motor. The flywheels 22 are of such a size that if all the motors 21 fail the pumps 17 are driven by inertia of the wheels 22, i.e., by the energy stored in them, long enough for the driving structure and its spindle 1 to come to a standstill.

In fact, in cartwheel antennae, braking devices are provided which act to bring the rotating array to a halt in such cases but this cannot happen instantly because of the large mass to be decelerated, so that without the proposal according to the invention, the fluid cushions which floatingly support the rotating part collapse and metallic contact occurs between the surfaces of the bearing before rotation has stopped and this generally results in destruction of the bearing.

There has been disclosed one embodiment of a hydrostatic bearing system which eliminates many of the drawbacks existent in comparable prior art systems. It should be noted, however, that the foregoing disclosure is in no way intended to limit the protection afforded this invention, but that there are many possible modifications and alterations which can be perfected without departing from the spirit and scope of the invention as herein claimed.

What is claimed is:

1. A hydrostatic bearing system, especially adapted for use with heavy radar antennae comprising a fixed supporting structure, a supported structure carried by said supporting structure and capable of rotation, and means, in the form of a plurality of cushions of fluid medium under hydrostatic pressure, for transmitting the load between the fixed supporting structure and the rotatable supported structure, the improvement being in that said fluid cushions are grouped together in groups of at least three cushions, the cushions of each group being spaced uniformly in the direction of rotation of the supported structure, and in that each group of cushions is associated with a separate and separately driven pump for supplying the fluid medium.

2. The invention as set forth in claim 1 and further comprising a driving motor associated with each pump, each driving motor having a flywheel provided on its shaft of such a size that on failure of the motor the supply of fluid to the cushions is maintained until the rotatable supported structure is stationary.

3. The invention as recited in claim 1 wherein each fluid cushion is formed by means of the cooperation between a pad associated with the fixed supporting structure and a supporting surface associated with the rotatable supported structure.

4. The invention as set forth in claim 3 wherein one face of each pad has a trough therein and wherein each trough is associated with a fluid supply passage.

5. The invention as defined in claim 4 wherein each pad is supported by the fixed supporting structure by means of a separate supporting member affixed to the supporting structure and a ball positioned intermediate each supporting member and the rear face of each pad.

6. The invention as set forth in claim 5 wherein each of said supporting members is movably affixed to the fixed supporting structure, the displacement of the supporting members altering the spacing between the supporting surface and the portion of the face of the pad not defining the trough.

7. The invention as recited in claim 6 wherein the portion of the face of each pad not defining the trough is of a shape matching the shape of the supporting surface.

8. The invention as set forth in claim 7 wherein the matching shape of the face of each pad and the supporting surface is spherical, said pad and supporting surface matching because one is concave spherical and the other is convex spherical.

9. The invention of claim 8 and further comprising a radial bearing associated with the rotatable supported structure and spaced from the plurality of cushions, the radial bearing structure serving to guide the rotatable supported structure in the fixed supporting structure.

10. The invention set forth in claim 9 wherein the rotatable supported structure is guided in the fixed supporting structure through the means of relative motion between the mating spherical surfaces of the supporting surfaces and the pad faces.

References Cited

UNITED STATES PATENTS

| | | | |
|---|---|---|---|
| 1,876,690 | 9/1932 | Kingsbury | 308—160 |
| 2,507,021 | 5/1950 | Lakey | 308—160 |
| 2,800,375 | 7/1957 | Heer | 308—160 |

FRED C. MATTERN, Jr., Primary Examiner

F. SUSKO, Assistant Examiner